United States Patent
Occhiato et al.

(10) Patent No.: US 8,752,796 B2
(45) Date of Patent: Jun. 17, 2014

(54) AUTOMATIC JETTISON SYSTEM FOR A ROTORCRAFT

(75) Inventors: John J. Occhiato, Derby, CT (US);
Gordon E. Winer, Bridgeport, CT (US);
Irvin B. Alansky, Cheshire, CT (US);
Steven E. Spoldi, Shelton, CT (US);
Anthony Z. Stobiecki, Vya, NV (US);
Joseph P. Skonieczny, Madison, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 147 days.

(21) Appl. No.: 13/224,612

(22) Filed: Sep. 2, 2011

(65) Prior Publication Data

US 2013/0056586 A1 Mar. 7, 2013

(51) Int. Cl.
*B64D 1/12* (2006.01)
*B64D 1/02* (2006.01)
*B64D 1/04* (2006.01)
*B64D 1/22* (2006.01)
*B64D 7/08* (2006.01)
*B64D 1/06* (2006.01)

(52) U.S. Cl.
CPC ... *B64D 1/02* (2013.01); *B64D 1/04* (2013.01); *B64D 1/22* (2013.01); *B64D 7/08* (2013.01); *B64D 1/06* (2013.01)
USPC ........................................ 244/137.4

(58) Field of Classification Search
CPC ............. B64D 1/02; B64D 1/04; B64D 1/22; B64D 7/08; B64D 1/06
USPC .......................... 244/1 TD, 136, 137.1, 137.4
See application file for complete search history.

(56) References Cited

U.S. PATENT DOCUMENTS

| | | | |
|---|---|---|---|
| 5,465,925 A * | 11/1995 | Connolly et al. | 244/137.1 |
| 5,499,785 A * | 3/1996 | Roberts et al. | 244/137.4 |
| 5,593,113 A | 1/1997 | Cox | |
| 2010/0140412 A1* | 6/2010 | Certain | 244/137.4 |
| 2010/0222993 A1* | 9/2010 | Brainard et al. | 701/124 |

* cited by examiner

*Primary Examiner* — Valentina Xavier
(74) *Attorney, Agent, or Firm* — Cantor Colburn LLP (57) ABSTRACT

A method of automatically jettisoning cargo suspended from a suspension system coupled to an auto jettison system, includes receiving an initial load value from at least one attachment point of the suspension system, the receiving of the initial load value in response to attaching the cargo to the suspension system; receiving an instantaneous load value of the cargo suspended on an attachment point, the attachment point being coupled to the cargo; predicting a rate of change of the instantaneous load value at a predetermined future time period; combining the predicted rate of change of the instantaneous load value with the initial load value to create a predicted load value; comparing the predicted load value to a threshold value for the attachment point; and jettisoning the cargo from the attachment point if the predicted value is greater than the threshold value.

20 Claims, 6 Drawing Sheets

AUTOMATIC JETTISON SYSTEM FOR A ROTORCRAFT

STATEMENT REGARDING FEDERALLY SPONSORED RESEARCH OR DEVELOPMENT

This invention was made with Government support under Contract No. N00019-06-C-0081 awarded by the Department of the Navy. The Government has certain rights in this invention.

FIELD OF INVENTION

The subject matter disclosed herein relates generally to the field of load-management system in a rotary-wing aircraft, and more particularly, to an auto jettison system and method for automatically detecting an attachment point failure of an external load supported from the bottom of a helicopter and releasing the external load if certain failure criteria are met.

DESCRIPTION OF RELATED ART

A utility helicopter's ability to carry cargo externally is one of its most important features. Such a utility helicopter is typically equipped to externally carry large, long or oddly shaped cargo provided that the cargo is within the lifting capacity of the helicopter. A significant advantage associated with this lifting capability is that a load may be picked up from or delivered to locations where access by other forms of transportation is difficult or impossible. Additionally, the systems do not require the helicopter to land to deliver or pick up the cargo.

Typically, a helicopter carries external cargo either with a single-point or a multi-point suspension system. A helicopter may have three external cargo attachment hooks (suspension points) displaced longitudinally on the bottom of the aircraft to carry external cargo—one on the center line forward of the aircraft center of gravity (forward hook), one on the center line substantially at the center of the aircraft's center of gravity (center hook), and one on the center line aft of the center of gravity (aft hook). In a single-point suspension system, external cargo may be independently attached to any attachment hook with up to three independently attached cargo carried by the three attachment hooks. However, in the case of a multi-point suspension system, typically, the forward hook is attached to the front of the cargo and the aft hook is attached to the rear of the cargo in a "Y" shaped arrangement. This arrangement stabilizes the cargo about the yaw axis, thereby significantly reducing the cargo's ability to swing nose left and nose right.

A problem associated with a two-point suspension system is that a failure of one suspension point results in all of the external cargo being supported by the other suspension point. This results in a longitudinally displaced suspension point and the creation of large forces and moments about the helicopter's center of gravity (since the suspension point is on the bottom of the aircraft and some distance forward or aft of the aircraft center of gravity). In some cases, these forces and moments cannot be effectively resisted and the helicopter must jettison the load in order to avoid danger to the helicopter and its crew.

BRIEF SUMMARY

According to one aspect of the invention, a method of automatically jettisoning cargo suspended from a suspension system coupled to an auto jettison system includes receiving an initial load value from at least one attachment point of the suspension system, the receiving of the initial load value in response to attaching the cargo to the suspension system; receiving an instantaneous load value of the cargo suspended on an attachment point, the attachment point being coupled to the cargo; predicting a rate of change of the instantaneous load value at a predetermined future time period; combining the predicted rate of change of the instantaneous load value with the initial load value to create a predicted load value; comparing the predicted load value to a threshold value for the attachment point; and jettisoning the cargo from the attachment point if the predicted value is greater than the threshold value.

According to another aspect of the invention, a method of automatically jettisoning cargo suspended from an aircraft, includes receiving an initial forward load value from a forward load cell signal and an initial aft load value from an aft load cell signal of a dual-point suspension system, the receiving of the initial load values in response to attaching the cargo to the dual-point suspension system; combining the initial forward load value with the initial aft load value to create a total initial load value; receiving an instantaneous forward load value of the forward load cell and an instantaneous aft load value of the aft load cell; receiving an airspeed value of the aircraft after failure of the suspension system; determining whether a detached load is present on the dual-point suspension system; comparing the airspeed value to a first threshold value; comparing the total initial load value to a second threshold value; and jettisoning the cargo if the detached load is present and both the airspeed value is less than the first threshold value and the total initial load value is less than the second threshold value.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of an auto jettison system coupled to a suspension system of a rotary wing aircraft for detecting and mitigating external load failure scenarios with exemplary embodiments are discussed below in detail. The auto jettison system is coupled to external attachment points located on the bottom of the rotary wing aircraft such as, for example, a helicopter and receives information related to an attachment point failure on any of the external attachment points. The auto jettison system activates an emergency release mechanism in a pre-determined time when it appears that the attachment point failure will exceed the structural limitations of the remaining cargo attachment point. Additionally, the auto jettison system predicts a forward attachment point failure of a light dual-point load and activates an emergency release mechanism for the aft attachment point when it appears that the aft attachment point will contact the airframe at the speed of travel of the helicopter.

Figure 1:
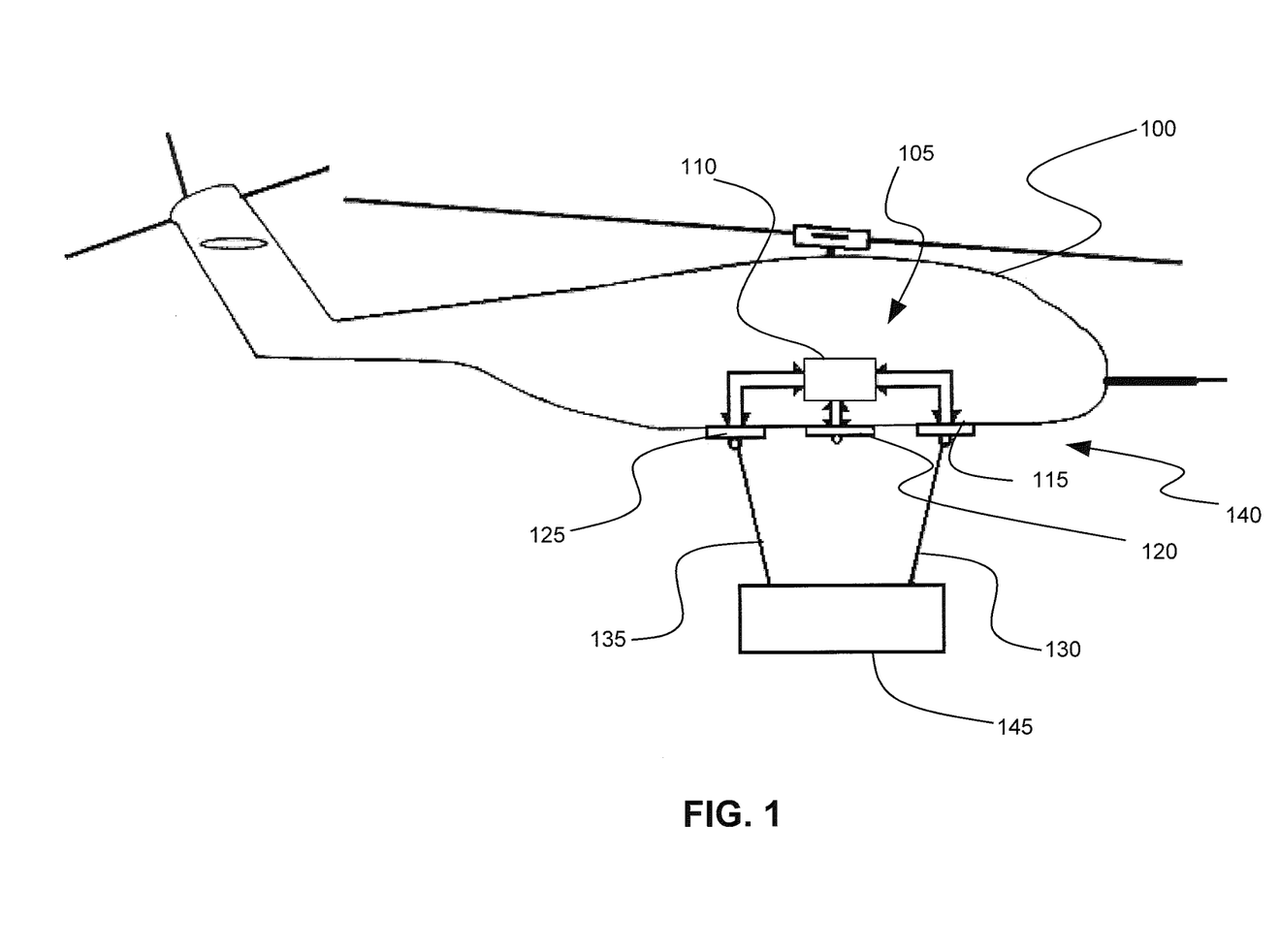
FIG. 1 illustrates a side view of an exemplary embodiment of a rotary-wing aircraft including a two-point suspension system connected to an external load.

Referring now to the drawings, FIG. 1 illustrates an exemplary vertical takeoff and landing ("VTOL") high-speed rotary-wing aircraft such as, for example, helicopter 100 having an auto jettison system 105 coupled to the airframe of the helicopter 100 according to an embodiment of the invention. Particularly, the auto-jettison system 105 includes a flight control computer system 110, which receives signals from a plurality of load cells (shown in FIG. 2) that are connected to a forward emergency release module assembly 115 ("ERM"), a center emergency release module assembly 120 ("ERM"), and an aft emergency release module assembly 125 ("ERM") respectively for identifying an attachment point failure ("APF"). The received signals from ERM's 115, 120, 125 are indicative of the magnitude of, in one exemplary embodiment, a suspended load 145 being carried by a suspension system 140 including a forward hook coupled to cable/sling 130 (hereinafter "forward hook assembly") and an aft hook coupled to cable/sling 135 (hereinafter "aft hook assembly"). The flight control computer system 110 provides control signals to circuitry in ERM's 115, 120, 125 to detect an abnormal increase in cable tension and automatically trigger an emergency release of the remaining attached hook on the load 145 in the event of an attachment point failure ("APF"). In one embodiment, the forward ERM 115 and aft ERM 125 provide connection points for coupling load 145 to hook assemblies including elastic cables or slings 130, 135, thereby providing a two-point suspension connection to the load 145. Although a two-point suspension to the load 145 is shown, it is to be appreciated that an additional cable/sling may be utilized in order to couple the center ERM 120 to a center hook assembly (not shown) for providing an additional suspension/attachment point for the helicopter 100. It is to be appreciated that, for purposes of describing the invention, the term "attachment point" or "suspension point" is intended to refer to an ERM 115, 120, 125 and a sling 130, 135 acting in cooperation to provide an attachment between the load 145 and the helicopter 100. In an exemplary operation, in the event of an APF on any of the suspension points causing an unbalanced load or an overload on the helicopter 100, the auto jettison system 105 will determine an APF condition and subsequent unsafe condition on the attached attachment point, and controls the forward ERM 130 and aft ERM 140 to release any of the attached slings 130 or 135 on the affected hook assembly, thereby releasing the load 145. In exemplary embodiments, an APF may occur due to a failure of a hook assembly including failure of a sling 130, 135, a snagged load where an attached sling 130, 135 is entangled in a ground structure, or a failure of the attachment point on the load 145 itself such as, for example, the bumper comes off of a vehicle carried by the suspension system.

Figure 2:
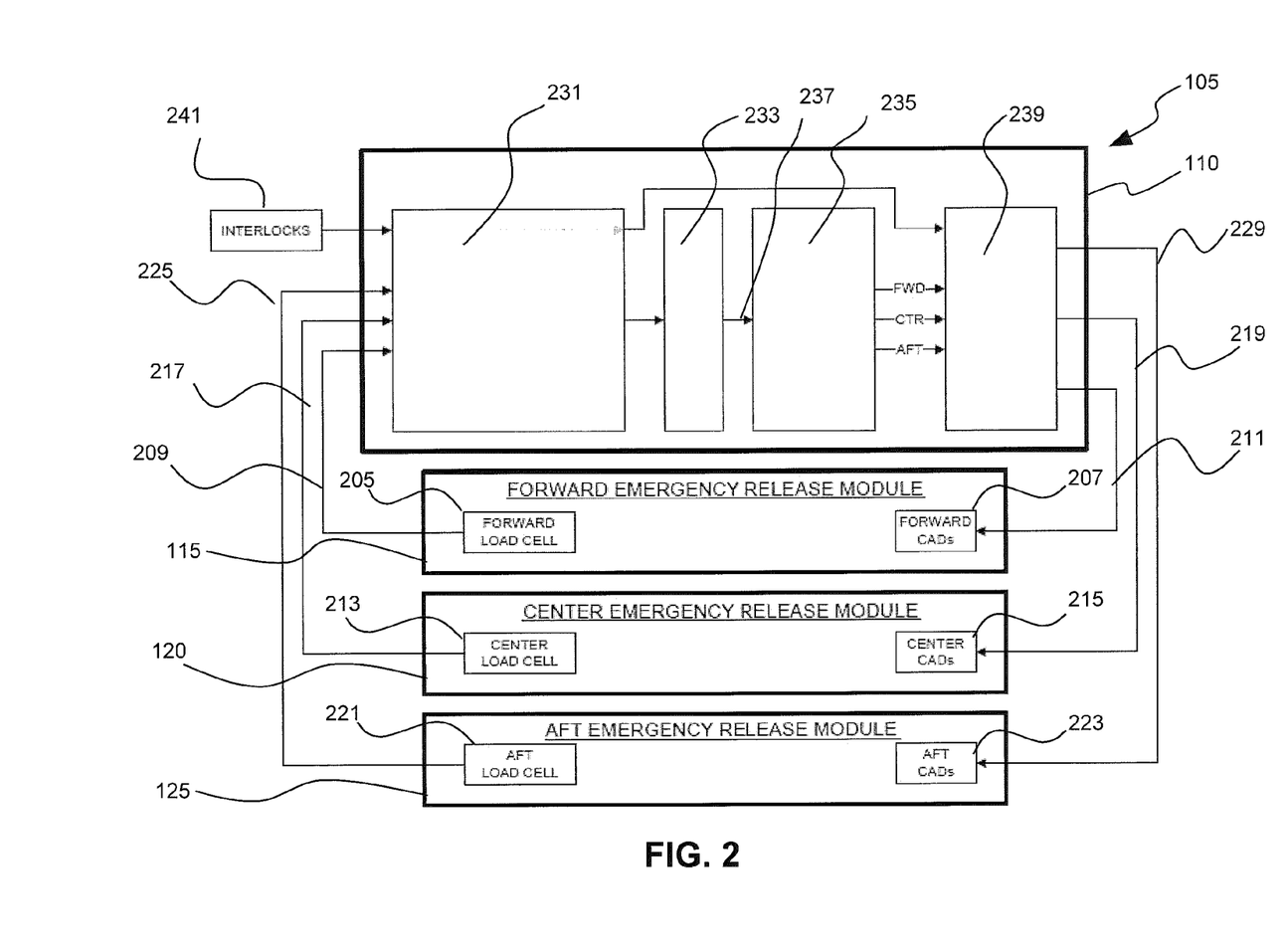
FIG. 2 illustrates a schematic block diagram of the system of FIG. 1 according to an embodiment of the invention.

FIG. 2 illustrates a schematic block diagram of the auto jettison system 105 for implementing the invention according to an exemplary embodiment. Particularly, the auto-jettison system 105 includes a flight control computer system 110 communicating with a forward ERM 115, a center ERM 120, and an aft ERM 125 through communication lines. Each ERM 115, 120, 125 is connected to respective hook assemblies and includes circuitry for respective load cells 205, 213, 221 for converting force applied by the load attached to each hook assembly into a measurable electrical output. In one exemplary embodiment, strain gage based load cells are utilized as the load cells 205, 213, 221. Additionally, the ERM's 115, 120, 125 include cartridge activated device assemblies ("CAD") 207, 215, 223 respectively for jettisoning respective loads being carried on the hook assemblies if certain criteria are met, which will be described in detail below. Flight control computer system 110 receives signals on line 209 from forward load cell 205 indicative of the magnitude of the load being carried by a forward hook assembly (not shown) connected to ERM 115 and transmits jettison command signals on line 211 to forward CAD assembly 207 for jettisoning the forward hook assembly (not shown) when carrying the load poses a safety hazard to the helicopter and its crew. Similarly, flight control computer system 110 receives signals on line 217 from center load cell 213 indicative of the magnitude of the load being carried by a center hook assembly (not shown) coupled to ERM 120 and transmits jettison command signals on line 219 to center CAD assembly 215 for jettisoning the forward hook assembly, while flight control computer system 110 receives signals on line 225 from aft load cell 221 indicative of the magnitude of a load being carried by an aft hook assembly (not shown) coupled to 125 and transmits jettison command signals on line 229 to aft CAD assembly 223 for jettisoning the aft hook assembly.

The load cells 205, 213, 221 are connected to a signal management circuit 231 via respective lines 209, 217, 225 for processing signals received from the respective load cells 205, 213, 221. The signal management circuit 231 filters and amplifies the low-level strain gage voltage signals from the load cells 205, 231, 221. In one embodiment, the signal management circuit 231 includes a filter to remove steady-state signals, an amplifier to amplify low-level analog signals and a signal multiplexer circuit to combine the several analog signals received for transmission to an analog-to-digital (A/D) converter 233. The A/D converter 233 periodically samples the amplified analog signals received from signal conditioning circuit 231 and produces a digital representation of the voltage level for the received signals. The A/D converter 233 is connected to a microprocessor 235 via a bus 237. The microprocessor 235 includes a computer program for implementing an auto jettison algorithm stored on volatile and nonvolatile memory to execute instructions related to identification and mitigation of external load failure scenarios. The microprocessor 235 interfaces with the CAD drive circuits 239 for transmitting signals related to auto jettisoning the cargo attached to the forward CAD assembly 207, the center CAD assembly 215, and the aft CAD assembly 223. Additionally, an interlock control circuit 241 is provided for selectively arming the auto jettison system 105 if all conditions are true by transmitting an interlock state indicative of a true condition determined by evaluating the signals received from, in some embodiments, several switches located on each landing gear to indicate if the aircraft is in flight mode, signals received from the load cells to determine if a load is present, or signals received from other systems to be evaluated that may cause an unsafe condition before the auto-jettison system 105 is armed automatically. In an exemplary embodiment, the auto-jettison system is armed after a predetermined number of seconds after a load is sensed on the hook assemblies and the interlock signal is true. When the cable load falls below the auto jettison system 105 enable threshold or the aircraft has one or more active weight on wheels ("WOW") indications, the auto jettison system 105 is disarmed automatically. In an exemplary operation, the CAD assemblies 207, 215, 223 receive jettison command signals from the microprocessor 235 in order to jettison the cargo suspended by the hook assemblies in the event that the flight control computer system 110 indicates, within a pre-determined time, that the tension in the cable attached to the ERM assemblies will exceed the structural limitations of the ERM assemblies and poses a danger to the helicopter and its crew.

Figure 3:
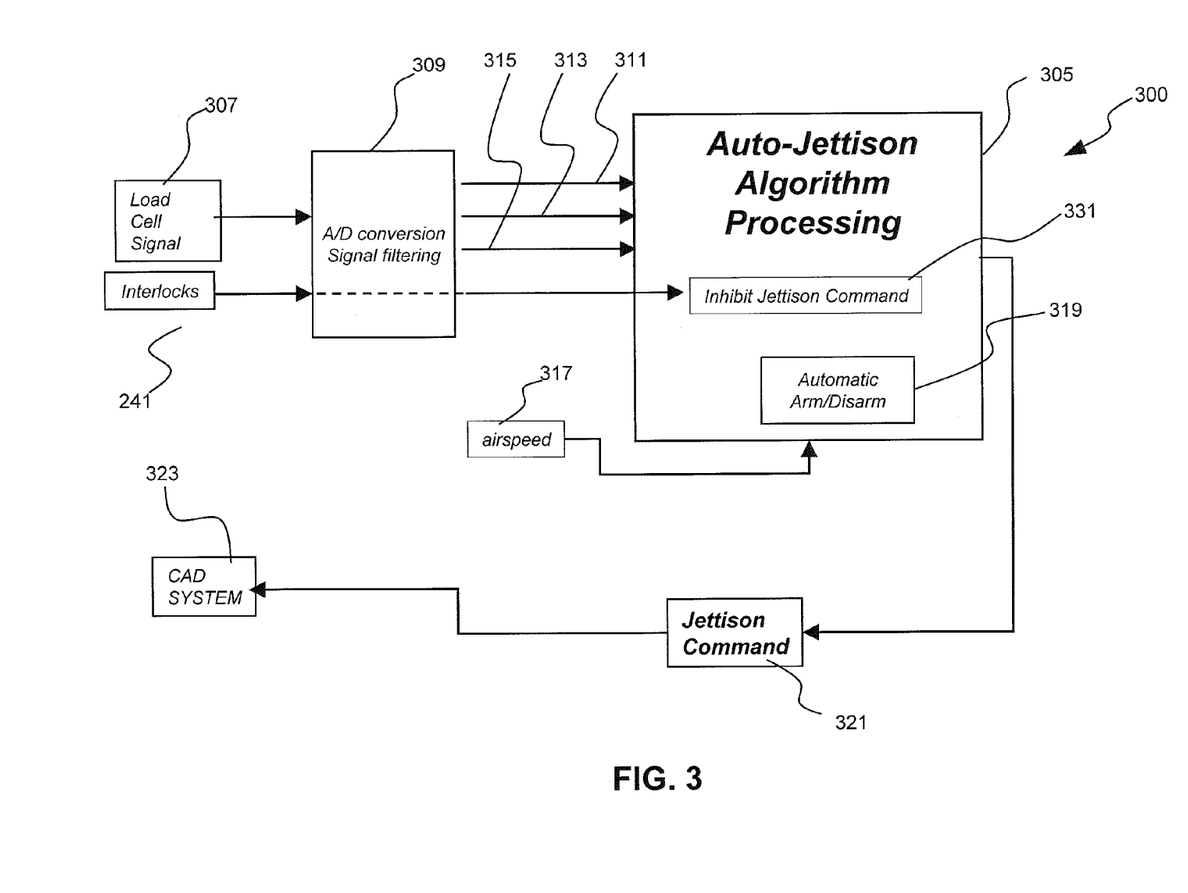
FIG. 3 illustrates a schematic block diagram of the algorithm used to determine whether to jettison an external load on the forward, aft, and center hook assemblies according to an embodiment of the invention.
Figure 4:
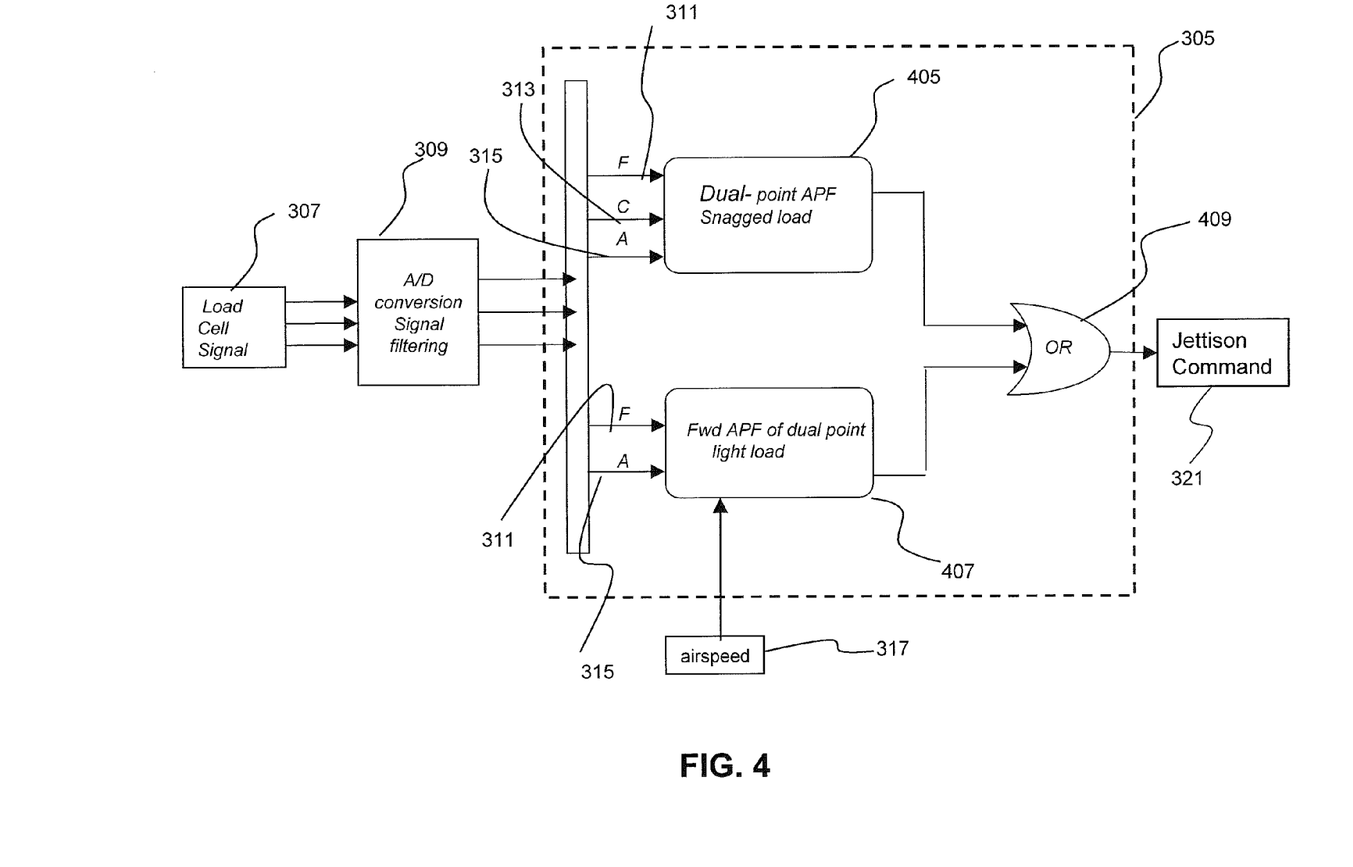
FIG. 4 illustrates another schematic block diagram of the algorithm used to determine whether to jettison an external load for a dual-point attachment point failure or a snagged load and a forward attachment point failure according to an embodiment of the invention.

FIGS. 3-4 illustrate a functional block diagram of the overall operation of the auto jettison system 105 installed in an aircraft 100 (FIG. 1) according to an embodiment of the invention. For ease of illustration and understanding, the functional block diagram in FIGS. 3-4 illustrates an auto-jettison program 300 (FIG. 3) stored in memory on flight control computer system 110 and executed by the microprocessor 235 (FIG. 2) for implementing the auto jettison algorithm 305 intended to detect an abnormal increase in cable/sling tension at the attachment points including measuring impending structural load limits following an APF of either the forward load hook or the aft load hook (FIG. 5) in a dual-point failure mode, intended to measure the potential for airframe contact by a load less than 6,000 lbs following a forward APF (FIG. 6), or intended to measure the potential for exceeding the structural load limit of a line for a snagged load APF in an individual or dual point operation (FIG. 5) during flight. In one embodiment, a snagged load APF would be an external load attached to a hook assembly, with the sling or line being entangled in a ground structure such as, for example, a tree. Initially and as shown in FIGS. 3-4, the auto jettison algorithm 305 initiates an arming or disarming subroutine by polling the load cells/sensors 307 for total static load force (average load value) of the forward hook assembly, center hook assembly, and aft hook assembly represented by digital signals converted from an A/D conversion process 309 for forward load line 311, center load line 313, and aft load line 315 for the attachment points. In one embodiment, the algorithm 305 will initiate automatic arming 319 (FIG. 3) of the auto-jettison system 110 (FIG. 1) after a predetermined number of seconds of sensing a load on any of the hook assemblies and other appropriate criteria are met such as, for example, load persistence, aircraft control mode is in flight mode etc., and will initiate automatic disarming 319 (FIG. 3) of the auto jettison system 110 (FIG. 2) after the load falls below the threshold needed to enable the system 110 or if the aircraft has one or more active WOW indications. Additionally, an interlock control circuit 241 (also shown in FIG. 2) is provided for selectively and automatically arming or disarming 319 the auto-jettison system 105 (FIG. 2) by transmitting an inhibit jettison command 331 from interlocks 241 indicative of an interlock state. The interlocks 241 evaluate the signals received from several switches located on each landing gear, signals received from the load cells 307, or signals received from other systems to be evaluated that may cause an unsafe condition before the auto-jettison system 105 (FIG. 2) is armed automatically. Furthermore, the algorithm 305 polls the flight control computer system 110 in order to continuously monitor the airspeed 317 of the helicopter 100 during flight. In one embodiment, the auto jettison algorithm 305 executes one or more subroutines to determine an APF on any hook assembly as well as determining if a structural load limit will be reached at a future predetermined time period and transmits a jettison command 321 to jettison the load and by transmitting a jettison signal to the CAD system 323 including the CAD assemblies 207, 225, 223 (FIG. 2).

With reference to FIG. 4, one exemplary subroutine 405 is shown where upon an APF of one of the suspension points in a dual-point attachment or if the load attached to a hook assembly in one or more single point attachment is snagged on an obstacle, the auto-jettison algorithm 305 executes a load predictor subroutine to determine whether the shock load on the remaining attachment point including an absolute value of the load at an time period/of the APF and the rate of change of the load will exceed the threshold load limit for the attachment point at a predetermined m future time period. If the shock load will exceed the threshold load limit, then the algorithm 305 initiates the jettison command 321 by transmitting a jettison signal to the CAD system 323 (FIG. 3) within a predetermined n time period prior to the threshold load limits being reached (i.e., n>m) in order to detonate the attached ordnance coupled to the particular CAD 207, 225, 223 (FIG. 2) and jettison the attachment point. In another exemplary subroutine 407, for a load weighing less than 6000 pounds in a forward APF attached to the helicopter 100 in a dual-point attachment, the auto-jettison algorithm 305 executes the subroutine 407 to determine if the airspeed 317 at the time period/of the APF exceeds a threshold speed v and the initial load at both suspension points on the dual-point attachment prior to the APF is less than 6,000 pounds, the algorithm 305 initiates the jettison command 321 by transmitting a jettison signal to the CAD system 323 (FIG. 3) within a predetermined n time period prior to the threshold limits being reached on the aft attachment point in order to detonate the attached ordnance coupled to the particular aft CAD 223 (FIG. 2) and jettison the aft attachment point before the swinging load strikes the airframe of the helicopter 100 (FIG. 1). The logic outputs of the subroutines 405, 407 are functionally shown as OR'ed together by an OR gate 409. The output of the OR gate 409 is true if any of its inputs are true. Thus, if any of the subroutines indicate that an APF has occurred and mitigation of the hazardous condition as a result of the APF is not able to be mitigated, the output of OR gate 409 will become true. Thus, the autojettison algorithm 305 initiates the jettison command 321 by transmitting a jettison signal to the CAD system 323 to jettison the attached load. In one embodiment, the respective values for m, n, and v are 100 milliseconds (ms), 33 ms, and 100 knots.

Figure 5:
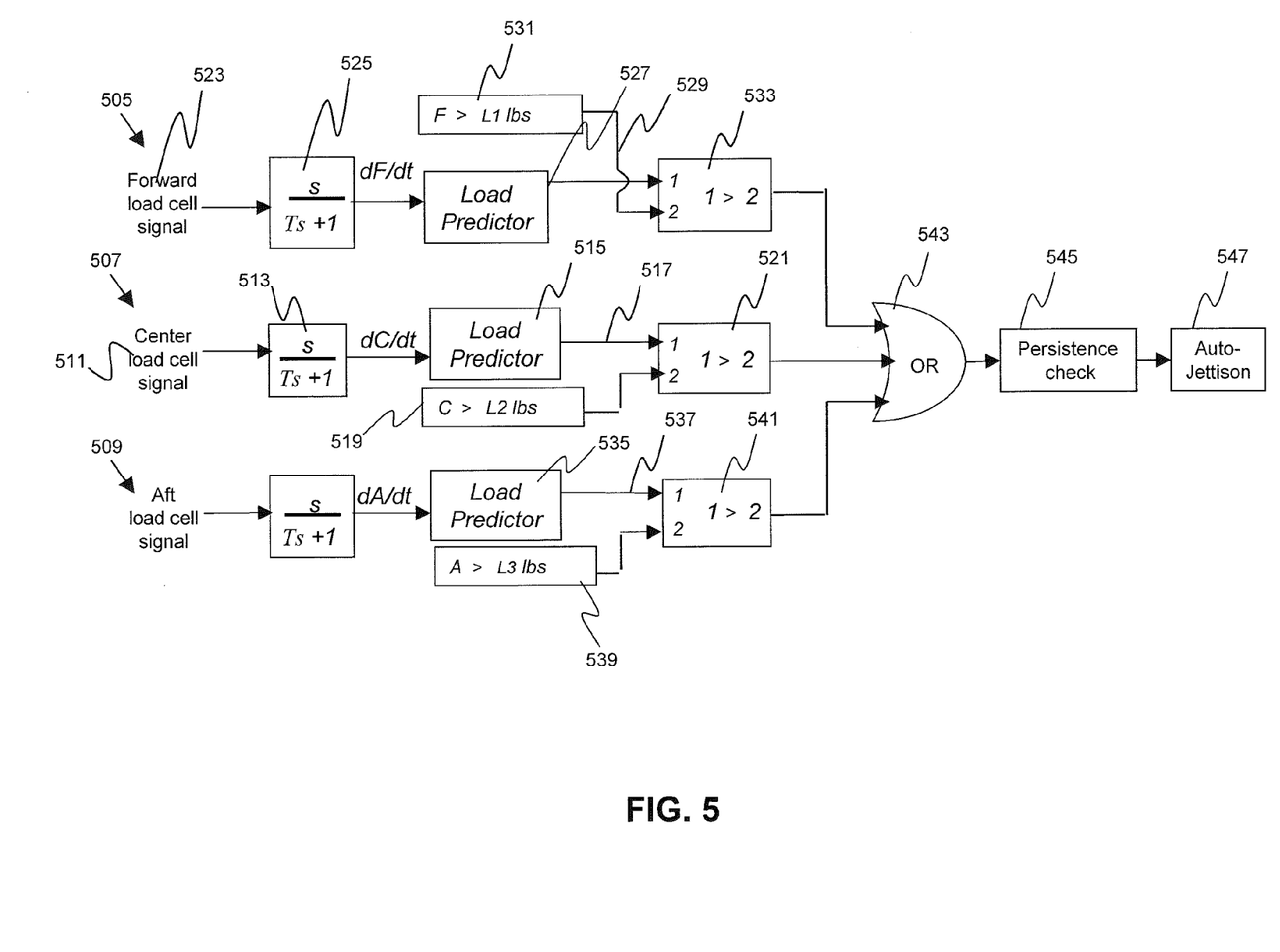
FIG. 5 illustrates a functional block diagram of an exemplary subroutine for use in FIG. 3-4 for evaluating a dual-point attachment point failure and a snagged load according to an embodiment of the invention.

FIG. 5 illustrates a control system diagram showing logic control for evaluating the load cell signals in order to determine the impending structural load limits following an APF for either the forward load hook assembly or the aft load hook assembly in a dual-point APF load condition or a snagged load APF load condition. As shown in FIG. 5, the control system diagram includes logic control for determining the rate of change in the load value for a future time period on any signal path, the forward cell signal path 505, the center cell signal path 507, and the aft cell signal path 509 on a snagged load condition or for determining the rate of change in the load value for a future time on the forward cell signal path 505 or the aft cell signal path 509 in a dual-point APF. In one embodiment, the center cell signal path 507 begins with a low-pass filter 513, which filters the center load cell signal 511 to remove its steady state components and produce a signal that represents the absolute instantaneous value $C_i$ of the snagged load on the center hook assembly at an initial time period $T_i$ of the APF. The output of the low pass filter 513 is supplied to a load predictor 515 that extrapolates out to a predetermined future time period $T_m$ the rate of change of the instantaneous value to produce an extrapolated center load value $C_m$ that represents the rate of change for the upcoming Tm future time period window. In one embodiment, the Tm time period window is 100 ms, although other time periods may be preselected without departing from the invention scope. The extrapolated value Cm is added to the absolute value Ci to form the center load predicted value 517 ("Op") and is compared against the maximum threshold value 519 ("L2") of the center hook assembly in a comparator 521 to determine which is greater. The value of L2 519 is a constant value in kilograms (or alternatively pounds) and is selected based on the particular application of the center ERM 120 (FIG. 1-2) including the loads that are expected to be carried by the helicopter 100. In one embodiment, L2 519 is 90,000 pounds. The comparator 521 outputs a true logic state if the Clp 517 on the center cargo hook assembly exceeds L2 519.

Also, FIG. 5 illustrates that the forward cell signal path 505 is substantially similar to the aft cell signal path 509, with each signal path 505, 509 determining the rate of change in the load value for a future time period in a dual-point APF. It is to be appreciated that a description of the forward cell signal path 505 provides an adequate description for the aft cell signal path 509. In one embodiment, the forward cell signal path 505 begins with a low-pass filter 525, which filters the forward load cell signal 523 to produce a signal that represents the absolute instantaneous value Fi of the load on the forward hook assembly at an initial time period Ti for a dual-point load caused by an aft APF. The output of the low pass filter 525 is supplied to a forward load predictor 527 that extrapolates out the rate of change of instantaneous load to a predetermined future time period Tm to produce an extrapolated value Fm that represents the rate of change for the upcoming Tm future time period window. In one embodiment, the Tm time period window is 100 ms, although other time periods may be preselected without departing from the invention scope. The extrapolated value Fm is added to the absolute value Fi to form the forward load predicted value 529 ("Flp") and is compared against the maximum threshold value 531 ("L1") in kilograms (or alternatively pounds) of the forward hook assembly in a comparator 533 to determine which is greater. The value L1 531 is a constant value and is selected based on the particular application of the forward ERM 115 (FIG. 1) including the loads that are expected to be carried by the helicopter 100. In one embodiment, L1 531 is 63,000 pounds. The comparator 533 outputs a true logic state if the Flp 529 on the forward cargo hook assembly exceeds L1 531.

Similarly, for the aft cell signal path 509, the extrapolated value Am representing the rate of change of load for the Tm time period for the aft load predictor 535 is added to the absolute value Ai of the load on the aft hook assembly at an initial time period Ti to form the aft load predicted value 537 ("Alp") and is compared against the maximum threshold value 539 ("L3") in kilograms (or alternatively pounds) for the aft hook assembly in a comparator 541 to determine which is greater. In one embodiment, L3 539 is 63,000 pounds. The comparator 541 outputs a true logic state if the Alp 537 on the aft cargo hook assembly exceeds L3 539. The logic outputs of the comparators 521, 533, 541 are input into an OR gate 543. If any of the inputs of the OR gate 543 are logically true, the OR gate 543 becomes true. Thus, if any load limit evaluation determines that a hook load limit has been exceeded on an attachment point, a logical true state is generated. The auto-jettison system 105 jettisons 547 the cargo hook load assembly associated with the true logic state for any of the cell signal paths 505, 507, 509 after a persistence check 545 is made for a finite time period of the respective load signal.

Figure 6:
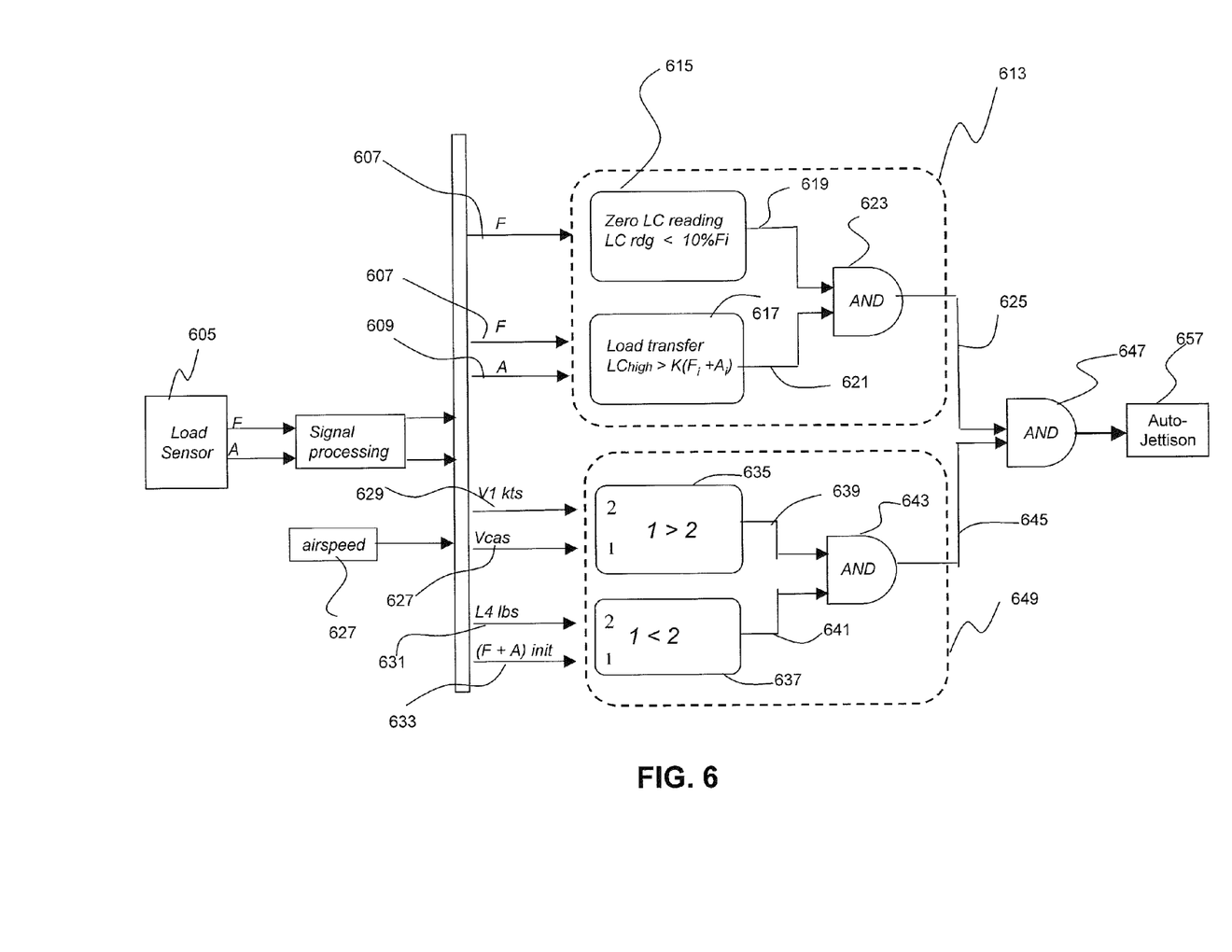
FIG. 6 illustrates a functional block diagram of an exemplary subroutine for use in FIG. 3-4 for evaluating a dual-point attachment point failure against load and airspeed thresholds according to an embodiment of the invention.

FIG. 6 illustrates a control system diagram showing logic control for evaluating the load cell signals received from the load sensors to determine a detached load condition for a load applying a load of less than 6,000 pounds in a forward APF in a dual-point load attachment. Particularly, the control system diagram includes logic control for determining a detached forward APF in a dual-point load attachment for light loads. In one embodiment, the load sensors 605 are polled for the load of the forward hook assembly and aft hook assembly represented by digital signals converted from an A/D conversion process 611. The logic control for determining a detached load 613 begins with a comparator 615, which receives the forward load cell signal 607 and compares it against the an initial value received prior to APF. The logic control determines whether the forward load cell signal 607 is at least less than, in one embodiment, 10 percent of the forward cell load value Fi prior to the APF. The comparator outputs 619 a true logic state if forward load cell signal 607 is less than 10 percent of Fi. In other embodiments, the percentage may be varying depending upon loads transported. Also, the forward load cell signal 607 and Aft load cell signal 609 are summed together (LChigh) and compared in comparator 617 to determine if a load transfer has occurred by comparing the LChigh against the total load value (Fi+Ai) of the forward cell load value Fi prior to an APF and the Aft cell load value Ai prior to the APF. The comparator 617 outputs 621 a true logic state if LChigh is greater than Fi+Ai. The results of each evaluation are functionally combined in the AND gate 623. The output 625 of the AND gate is true if output 619 and output 621 are both true.

Further, the logic control for determining load and airspeed threshold condition 649 begins with a comparator 635, which receives the airspeed signal 627 ("Vcas") at the time of the forward APF and compares it against a predetermined threshold 629 ("V1"). In one non-limiting embodiment, the predetermined threshold is set to 100 knots. The comparator outputs 639 a true logic state if Vcas 627 is less than the V1 629. Additionally, a comparator 637 receives the total load value 633 (Fi+Ai) of the forward cell load value Fi prior to an APF and the Aft cell load value Ai prior to the APF and compares it against a predetermined threshold load value 631 ("L4") in kilograms (or alternatively pounds). The comparator 637 outputs 641 a true logic state if Fi+Ai is less than L4 629. The results of each evaluation are functionally combined in the AND gate 643. The output 645 of the AND gate is true if output 639 and output 641 are both true. The output 625 of the detached load condition 613 is functionally combined with the output 649 of the load and airspeed threshold condition 649 in the AND gate 647. Thus, in one embodiment, if a detached load condition 613 determines that a detached load is present on the forward load cell, and the airspeed and load threshold condition 649 determines that the airspeed 627 has been exceeded and the load limit has not been exceeded, a logical true state is generated, and the auto jettison system 105 (FIG. 1) jettisons 657 the aft cargo hook load assembly after a persistence check is made for a finite time period of the respective load signal.

The technical effects and benefits of exemplary embodiments include an auto jettison system in an aircraft for measuring the tension in an external load cable attachment between the aircraft and an external load, and utilizing the measured force to detect and mitigate external load failure scenarios.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of automatically jettisoning cargo suspended from a suspension system coupled to an auto jettison system, comprising:
   receiving an initial load value from at least one attachment point of the suspension system, the receiving of the initial load value in response to attaching the cargo to the suspension system;
   receiving an instantaneous load value at an initial time period for the cargo suspended on the attachment point, the receiving of the instantaneous load value in response to a failure of the attachment point;
   predicting a rate of change of the instantaneous load value for a predetermined future time period;
   combining the predicted rate of change of the instantaneous load value with the instantaneous load value to create a predicted load value;
   comparing the predicted load value to a threshold value for the attachment point; and
   jettisoning the cargo from the attachment point within an intermediate time period if the predicted load value is greater than the threshold value, wherein the intermediate time period is less than the future time period and greater than the initial time period.

2. The method of claim 1, further comprising jettisoning the cargo after a persistence check of a load cell signal.

3. The method of claim 1, wherein the threshold value is calculated from a maximum rated value of the attachment point.

4. The method of claim 1, further comprising automatically arming the auto jettison system upon detecting the cargo on the attachment point and automatically disarming the auto jettison system upon detecting at least one of an absence of cargo on the attachment point or an absence of an interlock condition.

5. The method of claim 1, further comprising receiving each of the initial load value and the instantaneous load value from a load cell signal coupled to the at least one attachment point.

6. The method of claim 1, further comprising filtering the instantaneous value to remove its steady-state components.

7. The method of claim 1, wherein the jettisoning of the cargo further comprises activating a cartridge activated device connected to the attachment point.

8. A method of automatically jettisoning cargo suspended from an aircraft, comprising:
   receiving an initial forward load value from a forward load cell signal and an initial aft load value from an aft load cell signal of a dual-point suspension system, the receiving of the initial load values in response to attaching the cargo to the dual-point suspension system;
   combining the initial forward load value with the initial aft load value to create a total initial load value;
   receiving an instantaneous forward load value of the forward load cell and an instantaneous aft load value of the aft load cell;
   receiving an airspeed value of the aircraft after failure of the suspension system;
   determining whether a detached load is present on the dual-point suspension system;
   comparing the airspeed value to a first threshold value;
   comparing the total initial load value to a second threshold value; and
   jettisoning the cargo if the detached load is present and both the airspeed value is less than the first threshold value and the total initial load value is less than the second threshold value.

9. The method of claim 8, wherein the determining of the presence of the detached load further comprises:
   comparing the instantaneous forward load value to a percentage of the initial forward load value; and
   comparing the instantaneous aft load value to the total initial load value.

10. The method of claim 9, wherein the cargo is jettisoned if the instantaneous forward load value is less than the percentage of the initial forward load value and the instantaneous aft load value is greater than the total initial load value.

11. The method of claim 10, wherein the percentage is about 10 percent.

12. The method of claim 8, further comprising jettisoning the cargo after a persistence check of the aft load cell signal.

13. The method of claim 8, wherein the first threshold value is about 100 knots.

14. The method of claim 8, wherein the second threshold value is about 6,000 pounds.

15. The method of claim 8, further comprising coupling the dual-point suspension system to an auto jettison system.

16. The method of claim 15, further comprising automatically arming the auto jettison system upon detecting the cargo on the dual-point suspension system and automatically disarming the auto jettison system upon detecting at least one of an absence of cargo on the attachment point or an absence of an interlock condition.

17. The method of claim 8, further comprising receiving the initial forward load value from the forward load cell signal coupled to a forward attachment point of the dual-point suspension system.

18. The method of claim 8, further comprising receiving the initial aft load value from the aft load cell signal coupled to an aft attachment point of the dual-point suspension system.

19. The method of claim 8, further comprising filtering the instantaneous forward and aft load values to remove their steady-state components.

20. The method of claim 15, wherein the jettisoning of the cargo further comprises activating a cartridge activated device connected to at least one of the forward attachment point and the aft attachment point.

* * * * *